(12) United States Patent
Chang et al.

(10) Patent No.: US 7,133,257 B2
(45) Date of Patent: Nov. 7, 2006

(54) CONTROL OF TWIST, CROWN AND CAMBER FOR SLIDERS USING LOCATION SENSITIVE SCRIBING

(75) Inventors: Ping-Wei Chang, San Jose, CA (US); Chie Ching Poon, San Jose, CA (US); John Raniseski, San Jose, CA (US); Andrew C. Tam, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/038,332

(22) Filed: Jan. 18, 2005

(65) Prior Publication Data

US 2005/0180051 A1  Aug. 18, 2005

Related U.S. Application Data

(62) Division of application No. 09/916,851, filed on Jul. 27, 2001, now abandoned.

(51) Int. Cl.
*G11B 5/60* (2006.01)
*G11B 5/127* (2006.01)

(52) U.S. Cl. .............................. 360/234.3; 29/603.09; 219/121.85

(58) Field of Classification Search ........... 219/121.69, 219/121.68, 121.85, 121.83, 121.73; 29/603.09, 29/603.12, 603.16, 603.17, 603.18, 407.01, 29/407.05; 264/400, 482, 40.1
See application file for complete search history.

(56) References Cited

U.S. PATENT DOCUMENTS

| | | | | |
|---|---|---|---|---|
| 5,266,769 A | * | 11/1993 | Deshpande et al. .... | 219/121.69 |
| 6,108,170 A | * | 8/2000 | Crawforth et al. ....... | 360/234.3 |
| 6,295,719 B1 | * | 10/2001 | Strom ...................... | 29/603.12 |
| 6,321,440 B1 | * | 11/2001 | Crawforth et al. ......... | 29/603.1 |
| 6,441,385 B1 | * | 8/2002 | Khlif .......................... | 250/548 |
| 6,546,355 B1 | * | 4/2003 | Matsushita .................. | 702/152 |
| 6,548,009 B1 | * | 4/2003 | Khlif et al. .................. | 264/400 |
| 6,631,548 B1 | * | 10/2003 | Chang et al. ............. | 29/603.09 |
| 6,784,398 B1 | * | 8/2004 | Khlif et al. ............. | 219/121.65 |
| 6,888,701 B1 | * | 5/2005 | Chang et al. ............. | 360/234.3 |
| 2001/0046105 A1 | * | 11/2001 | Matsushita ............... | 360/234.3 |
| 2002/0035778 A1 | * | 3/2002 | Hashimoto et al. ...... | 29/603.09 |
| 2002/0179861 A1 | * | 12/2002 | Khlif ......................... | 250/548 |
| 2003/0029847 A1 | * | 2/2003 | Khlif et al. ............. | 219/121.65 |

* cited by examiner

*Primary Examiner*—William J Klimowicz
(74) *Attorney, Agent, or Firm*—Konrad Raynes & Victor, LLP; Alan S. Raynes

(57) ABSTRACT

Embodiments include a method for adjusting the twist, crown and camber of an air bearing surface a slider to substantially match final target values for twist, crown and camber, the slider having a back surface opposite the air bearing surface. The method includes the steps of measuring the twist, crown and camber of the at least one slider. A first group of twist scribes may be formed on the back surface. A first group of crown and camber scribes are formed on the back surface. The twist, crown and camber of the slider are measured and comparing to the final target values. Additional twist scribes may be formed if the final target value for twist is not reached or if the final target value is exceeded. Additional crown and camber scribes may be formed if the final target values for crown and camber are not obtained.

20 Claims, 13 Drawing Sheets

CONTROL OF TWIST, CROWN AND CAMBER FOR SLIDERS USING LOCATION SENSITIVE SCRIBING

This is a divisional of U.S. application Ser. No. 09/916,851, filed Jul. 27, 2001, now abandoned which is hereby incorporated by reference in its entirety.

FIELD OF THE INVENTION

Embodiments of the present invention relate generally to disk drive systems and to the manufacture of slider devices used in the disk drive system. More particularly, certain embodiments relate to methods for controlling the adjustment of twist, crown and camber of sliders using laser scribing.

DESCRIPTION OF RELATED ART

Magnetic storage systems typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also includes a head actuator for moving the magnetic recording head relative to the disk surfaces, and electronic circuitry for processing signals to implement various functions of the disk drive.

The head is attached to a carrier or slider having an air bearing surface which is supported during operation adjacent to the data surface of the disk by a cushion of air generated by the rotating disk. The terms "head" and "slider" are sometimes both used to refer to the slider having a head attached thereon. The slider design affects the efficiency, density, speed and accuracy with which the data can be read and written to the disk. Recording density generally depends on the separation distance (also known as flying height) between the recording element of the head and the disk. Lower flying heights are usually desired to achieve high areal density recording. As flying height is reduced, it becomes increasingly difficult to maintain the flying height accuracy to the degree necessary for reliable reading and recording of data. In addition, lower flying heights can lead to undesirable interactions between the head and the disk.

The slider is typically fabricated from a hard ceramic material, and the disk typically includes a hard carbon coating. The slider material is chosen so that any interactions between the disk and air bearing surface of the slider will not result in premature wear or breakage of the slider. In addition, the slider material should be relatively inert so that no chemical reactions take place on the air bearing surface. As illustrated in FIG. 1, sliders are usually derived from a wafer 10 made from a ceramic material such as a mixture of aluminum oxide ($Al_2O_3$) and titanium carbide (TiC). The components of each read/write device are formed or deposited on a surface 12 of the wafer 10 and the wafer 10 is diced into rows such as row 20 illustrated in FIG. 2. The row 20 has an end surface 12 having the read/write device and a row face that is processed, usually by polishing and/or etching, to form an air bearing surface 18. The row 20 is then diced into individual sliders 30 having an air bearing surface 18 and a read/write device surface 12 on which the read/write device is typically located at a central position 32, as illustrated in FIG. 3. The end surface 12 of the slider at the position where the read/write device is located may also be known as the trailing edge. FIG. 4a illustrates a slider 30 having a leading edge 14, a trailing edge 12, an air bearing side 18, a back or flex side 22, and x and y directions. FIG. 4b illustrates a side view of the slider 30 from the y direction and shows a disk 40 over which the slider 30 flies.

The slider is often formed with an aerodynamic pattern of protrusions (air bearing pattern) on the air bearing surface which enable the slider to fly at a constant height close to the disk during operation of the disk drive. It has been found that several important characteristics of the slider related to obtaining the desired flying characteristics for the slider are crown, camber and twist. These characteristics relate to the curvature of the slider. Crown is the deviation from an imaginary planar surface in the direction of air flow (x-direction, or leading edge to trailing edge), with a concave air bearing surface shape defined as negative crown and a convex shape defined as positive crown. Similarly, camber is the deviation from the same imaginary planar surface in the y-direction (normal to the direction of air flow). A concave air bearing surface shape is defined as negative camber and a convex shape is defined as positive camber. Twist is the difference between the diagonal curvatures. The crown is the maximum spacing between the surface of back side 22 and the dotted line in FIG. 4b, which is along the x-direction. Similarly, the camber is the maximum spacing between the back surface and a dotted line along the y-direction, and the twist is the difference in diagonal curvatures. For typical slider designs, neither negative crown nor negative camber of the air bearing surface is desired because it leads to variations in the slider flying height and also makes it more likely that the edges and corners of the slider will damage the recording medium should there be contact between them. It should be understood that in the difference calculation for twist, a positive or a negative twist value is possible. The mathematical sign for the twist value therefore depends on the choice of the order of the two diagonal curvatures in the subtraction. Thus, a positive twist can be interpreted as a negative twist of the same magnitude if the order of the two diagonal curvatures in calculating their difference is reversed. An interpretation of the sign convention for twist, opposite to that described in this invention, should not limit the scope of embodiments of the present invention.

Adjusting any one parameter of the crown, camber and twist may lead to changes in the other parameters, as they all pertain to the same surface. It has been difficult to control these parameters because when an operation is carried out to control one parameter, the others may change in an unpredictable and undesirable manner.

SUMMARY

One embodiment relates to a method for adjusting the curvature of an air bearing surface of a slider, the slider including a leading edge, a trailing edge opposite the leading edge, and a back surface opposite the air bearing surface, the back surface including a substantially rectangular shape having four corner areas including first and second corner areas adjacent to the trailing edge and third and fourth corner areas adjacent to the leading edge, wherein the first and third corner areas are diagonally opposite to one another and the second and fourth corner areas are diagonally opposite to one another. The method includes scribing at least one line in one of the first or second corner areas and scribing at least one line in one of the third or fourth corner areas, wherein the scribe lines are made in diagonally opposite corner areas.

Another embodiment relates to a method for altering the twist of a slider including an air bearing surface, a leading edge, a trailing edge opposite the leading edge, and a back surface opposite the air bearing surface, the back surface including an upper right corner region and an upper left corner region adjacent to the trailing edge, and a lower right hand corner region and a lower left hand corner region adjacent to the leading edge. The method includes forming a plurality of scribes in one of (i) the upper right corner region and the lower left corner region; or (ii) the upper left corner region and the lower right corner region.

Another embodiment relates to a method for altering the curvature of a slider including an air bearing surface, a leading edge, a trailing edge opposite the leading edge, and a back surface opposite the air bearing surface, the back surface including an upper right corner region, an upper middle region, and an upper left corner region adjacent to the trailing edge, the back surface also including a lower right corner region, a lower middle region, and a lower left corner region adjacent to the leading edge, the back surface also including a center right region, a center middle region, and a center left region. The method includes forming a first scribe in one of the upper right corner region or the upper left corner region; and forming a second scribe in one of the lower left corner region or the lower right corner region, wherein the first and second scribes are located in one of (i) the upper right corner region and lower left corner region, or (ii) the upper left corner region and lower right corner region.

Still another embodiment relates to a method for adjusting the twist, crown and camber of an air bearing surface of at least one slider to substantially match final target values for twist, crown and camber, the at least one slider having a back surface opposite the air bearing surface, the back surface including two sets of diagonally opposite corner regions. The method includes measuring the twist, crown and camber of the at least one slider. A first group of twist scribes is formed on the back surface in one of the two sets of diagonally opposite corner regions. A first group of crown and camber scribes is formed on the back surface. The twist, crown and camber of the slider are measured and compared to the final target values. Additional twist scribes are formed if the final target value for twist is not reached. Additional crown and camber scribes are formed if the final target values for crown and camber are not reached.

Another embodiment relates to a slider including an air bearing surface, a leading edge adjacent to the bearing surface, a trailing edge opposite the leading edge, and a back surface opposite the air bearing surface, the back surface including an upper right corner region and an upper left corner region adjacent to the trailing edge. The back surface also includes a lower right corner region and a lower left corner region adjacent to the leading edge. The slider also includes a plurality of scribes in either (i) the upper right corner region and the lower left corner region; or (ii) the upper left corner region and the lower right corner region.

Another embodiment relates to a slider including an air bearing surface, a leading edge adjacent to the air bearing surface, and a trailing edge opposite the leading edge. The slider also includes a back surface opposite the air bearing surface, the back surface including an upper right corner region, an upper middle region, and an upper left corner region adjacent to the trailing edge. The back surface also includes a lower right corner region, a lower middle region, and a lower left corner region adjacent to the leading edge. The back surface also includes a center right region, a center middle region, and a center left region, the method comprising. The slider also includes at least one upper scribe in one of (i) the upper right corner region or (ii) the upper left corner region. The slider also includes at least one lower scribe in one of (i) the lower left corner region or (ii) the lower right corner region. The upper and lower scribes are located in one of (i) the upper right corner region and lower left corner region, or (ii) the upper left corner region and lower right corner region.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

Preferred embodiments of the present invention are described with reference to FIGS. 5–11. While the invention is described in terms of the best mode for achieving this invention's objectives, it will be appreciated by those skilled in the art that variations may be accomplished in view of these teachings without deviating from the spirit or scope of the invention.

Certain preferred embodiments of the present invention provide methods for adjusting the three curvatures of a slider (twist, crown and camber) in a manner so that they reach desirable curvature values. It has previously been difficult to predictably adjust twist while having little effect on camber and crown. Certain preferred embodiments utilize a laser scribe in order to adjust twist with minimal effects on camber and crown. U.S. Pat. No. 6,631,548 relates to adjusting slider curvature and is hereby incorporated by reference in its entirety. U.S. Pat. No. 6,888,701 also relates to adjusting slider curvature and is hereby incorporated by reference in its entirety.

Figure 5A:
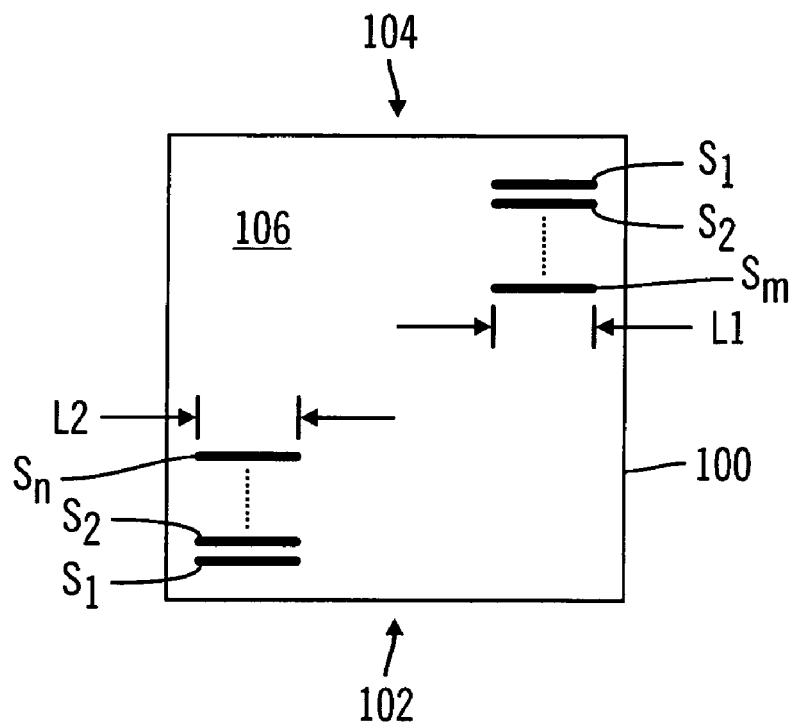
FIGS. 5a and 5b illustrate laser scribe line designs according to embodiments of the present invention.
Figure 5B:
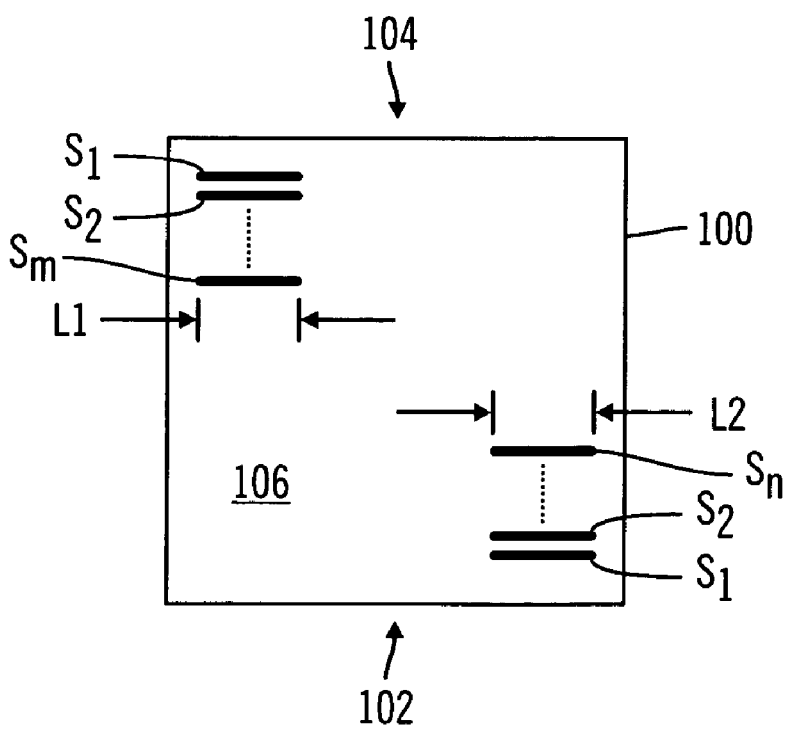

FIGS. 5a and 5b illustrate laser scribe line designs according to first and second embodiments of the present invention. As seen in FIG. 5a, a slider 100 includes leading edge 102 and trailing edge 104, which is also the deposited end of the slider where the read/write element may be positioned. Laser scribed lines marked as $S_1, S_2 \ldots S_m$ and $S_1, S_2 \ldots S_n$ are located at diagonally opposite corner areas on the back (flex) side 106 of the slider 100. The diagonal layout of scribe lines in the upper right and lower left corner regions of the back side 106 have been found to usually produce a positive twist change. FIG. 5b is similar to FIG. 5a, but shows a slider 100 having scribe lines $S_1, S_2 \ldots S_m$ and $S_1, S_2 \ldots S_n$ which are positioned at the other diagonally opposite corner areas of the back side 106. The diagonal layout of scribe lines in the upper left and lower right corner regions of the back side 106 usually produce a negative twist change. The length of the scribe lines is shown by the arrows L1 and L2.

Figure 5C:
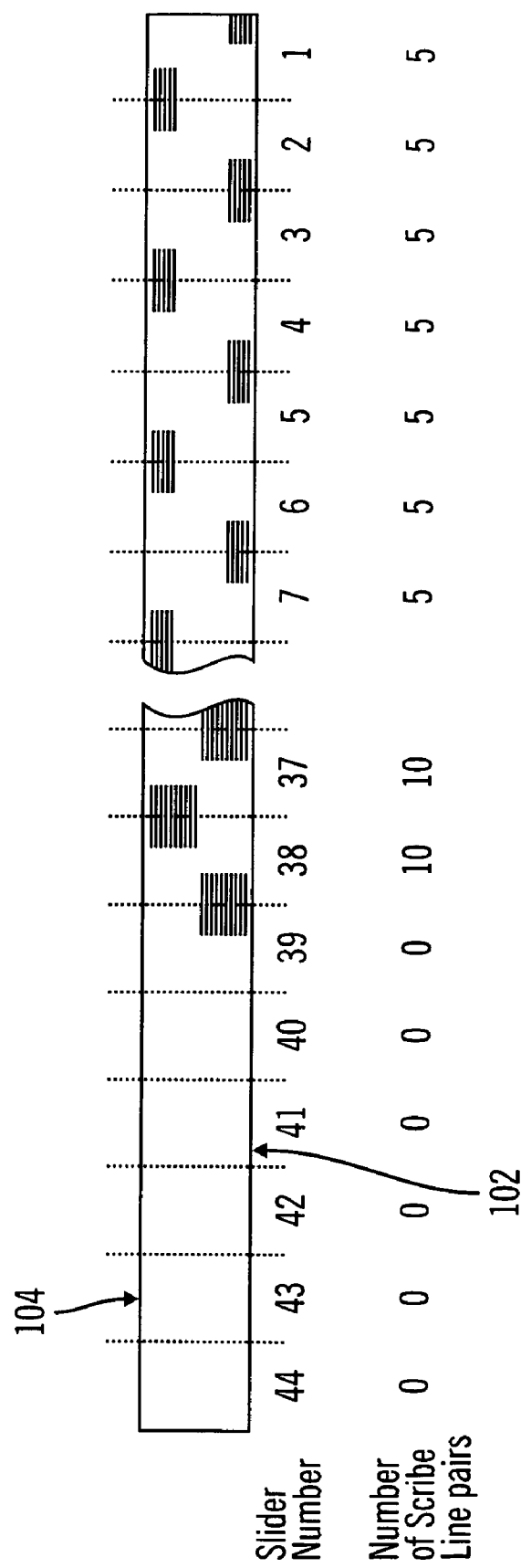
FIG. 5c illustrates the laser scribe line arrangement along a row in producing the alternating twist changes such as that in FIGS. 6a, 6b and 8.
Figure 6A:
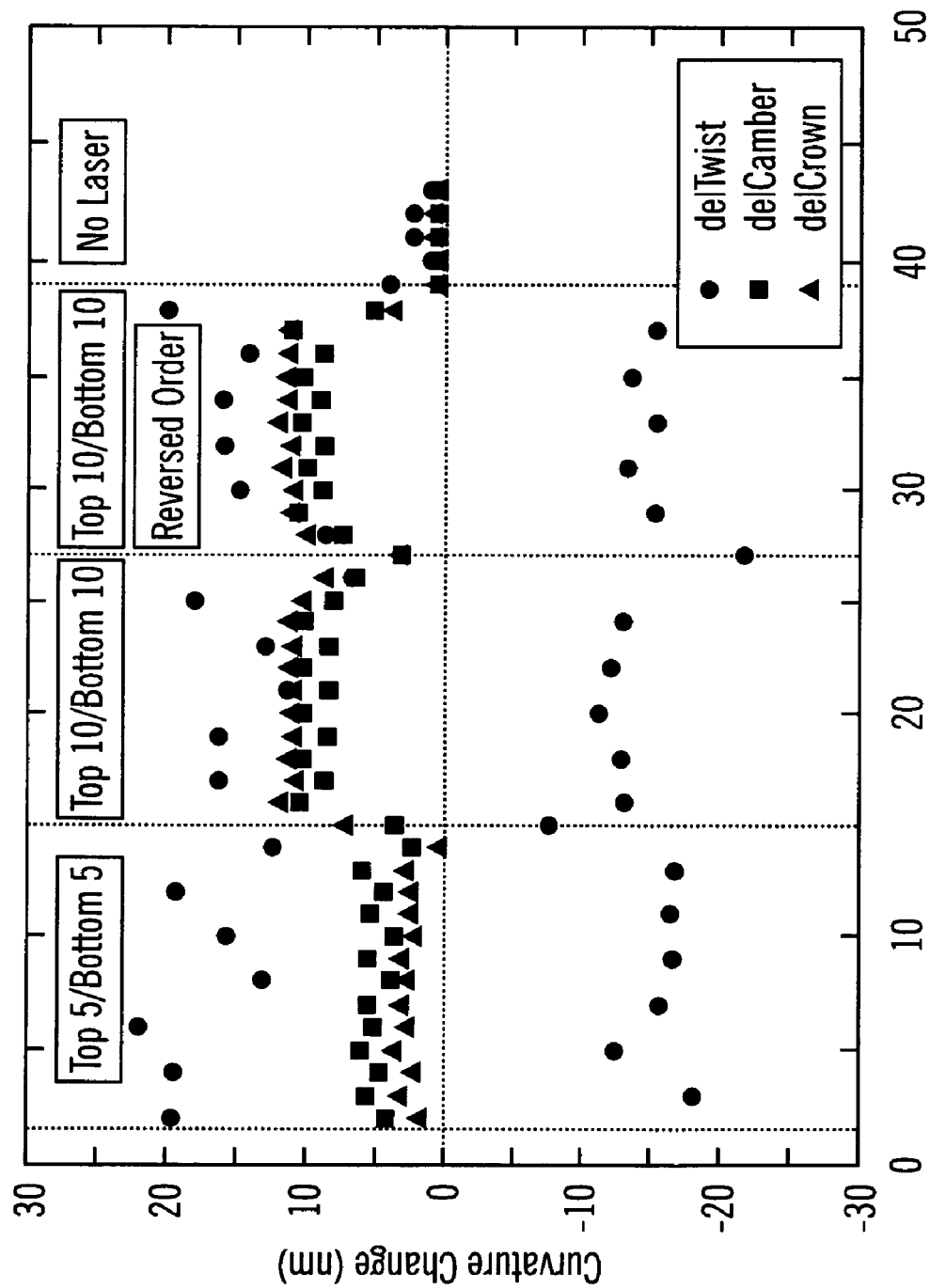
FIGS. 6a and 6b illustrate the curvature (twist, crown and camber) changes by laser scribing on a row of sliders in accordance with embodiments of the present invention.

FIG. 6a shows a graph including the curvature (twist, crown and camber) changes (delTwist, delCrown, and delCamber in FIG. 6a) by laser scribing on the flex sides of a row of 44 sliders. The scribe patterns along the row alternate for adjacent sliders 1 to 37 between those shown in FIG. 5a and FIG. 5b, yielding alternating negative and positive twist changes, respectively. The overall scribe patterns are depicted in FIG. 5c. The scribe lines lengths L1 and L2 are equal to about 500 μm. The number of scribe lines varies from 0 to 10, with n=m. For sliders 2 to 14, n=m=5 scribe lines, for sliders 16 to 26 and 28 to 38, n=m=10 scribe lines, and sliders 15, 27 and 39 to 44 were not scribed. Sliders 28 to 38 were scribed in a reversed alternating scribe pattern from sliders 2 to 14 and 16 to 26. As seen in the graph of FIG. 5a, the scribe lines yielded larger changes in twist than in camber and crown, with the largest twist changes when 5 top and 5 bottom scribe lines were used.

Figure 6B:
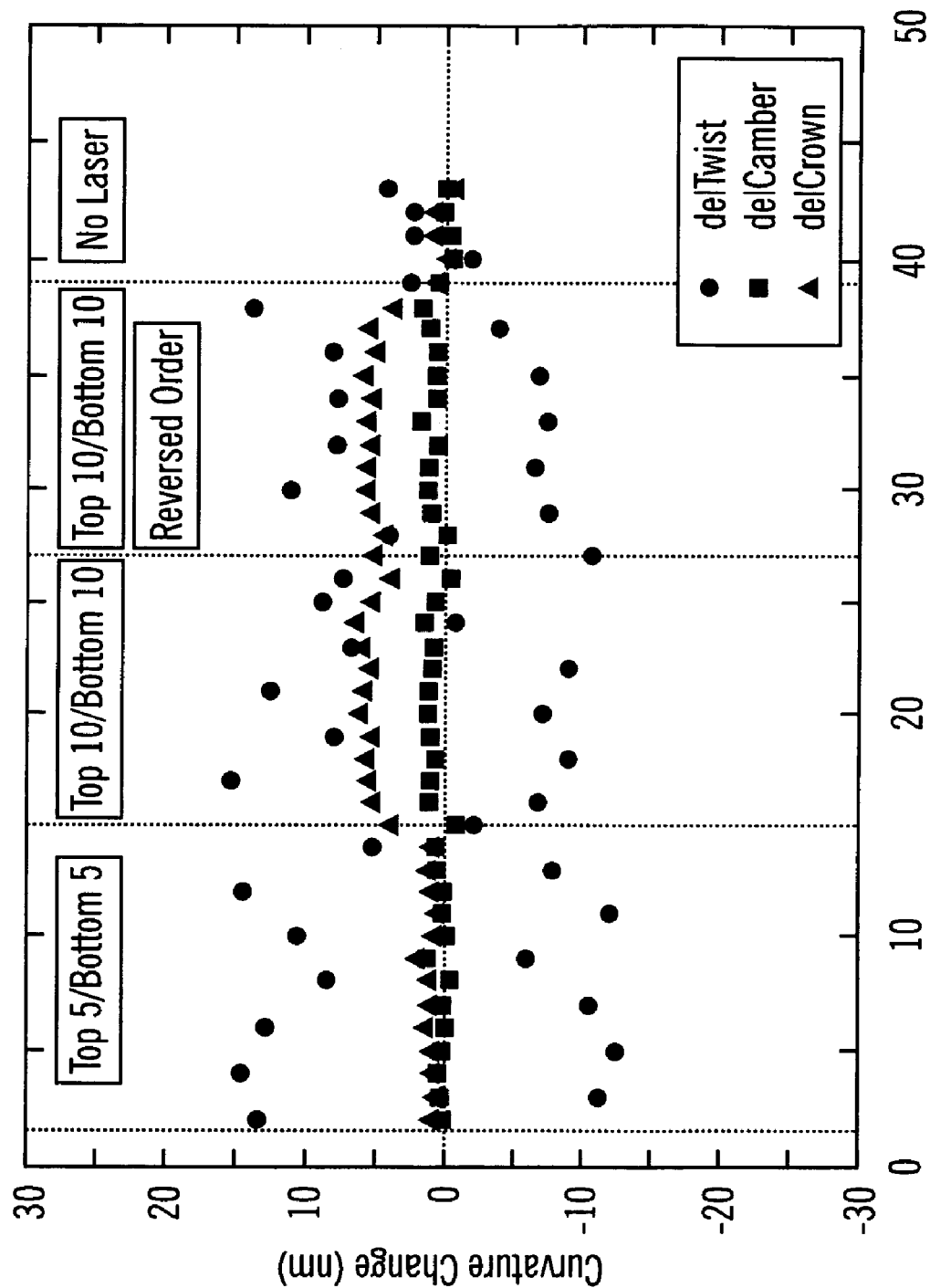

FIG. 6b shows another graph including the curvature change for scribed lines by laser scribing in a manner similar to that of FIG. 6a, however, the length of the scribes differs from that of FIG. 5a, with L1 and L2 of equal length of about 250 μm. Once again, the scribe lines yielded larger changes in twist than in camber and crown. Particularly significant is that for the 5-scribe group of sliders (sliders 2 to 14), both camber and crown are not significantly affected by twist changes. In addition, the data indicates that camber is generally insensitive to the short scribe lengths.

Figure 7:
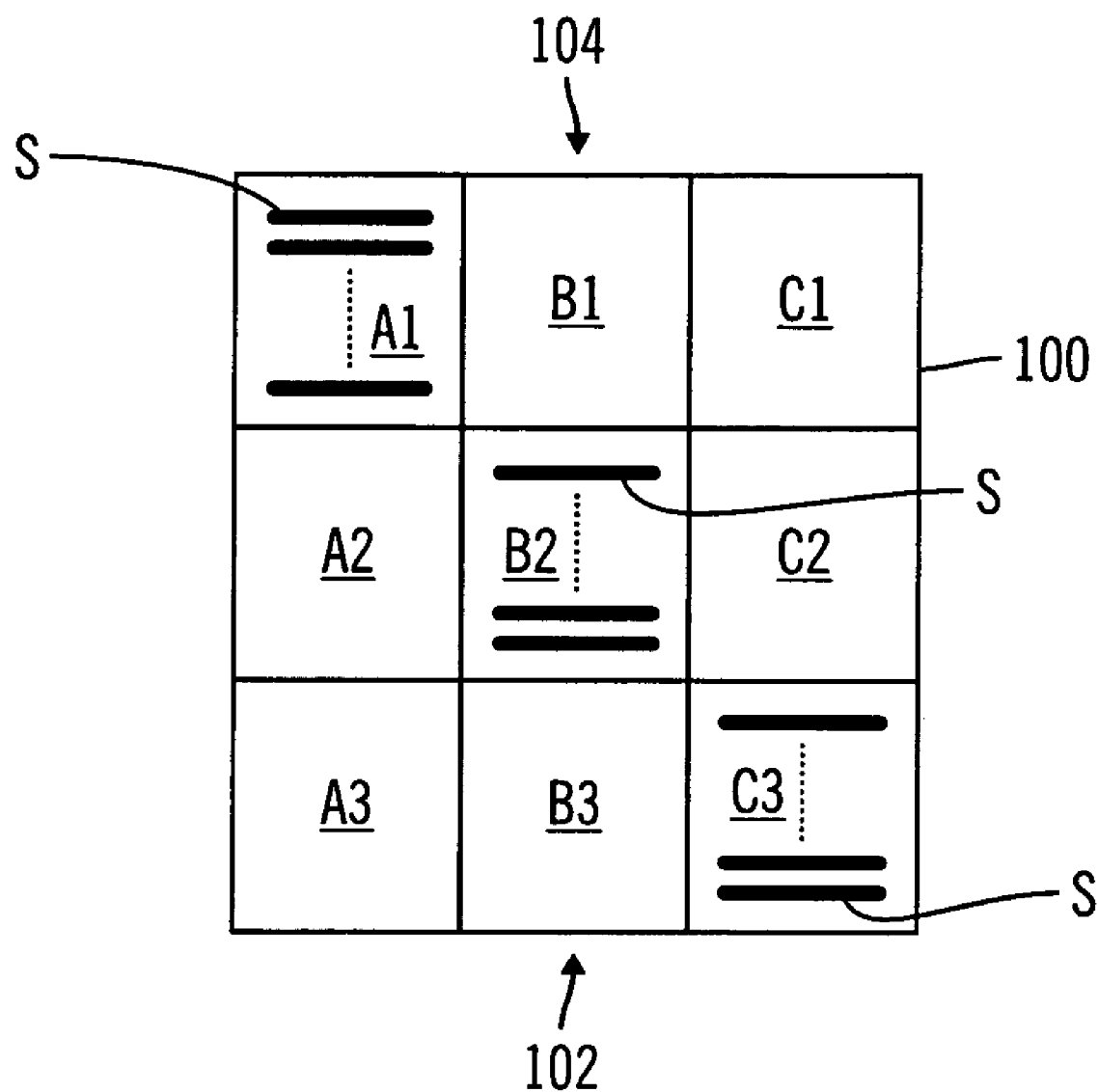
FIG. 7 illustrates the back side of a slider divided into nine approximately equal imaginary cells for forming scribes in accordance with embodiments of the present invention.
Figure 8:
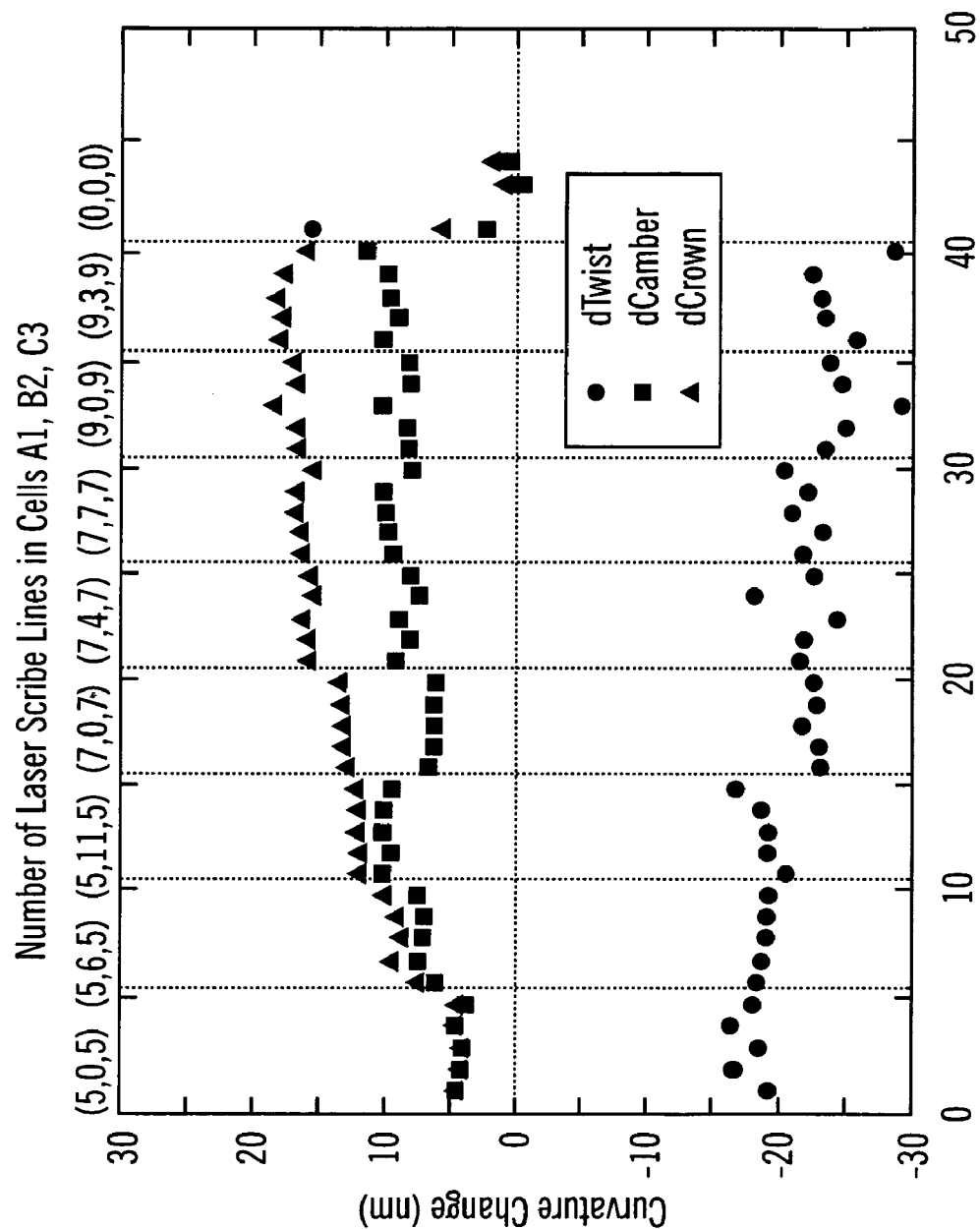
FIG. 8 shows the curvature (twist, crown and camber) changes for various asymmetric laser scribing patterns on the back side of a slider in accordance with embodiments of the present invention.

Another embodiment divides the back side of a slider 100, with leading edge 102 and trailing edge 104, into nine (3×3, including A1, B1, C1 on an upper region, A2,B2,C2 on a middle region, and A3,B3,C3 on a lower region) approximately equal imaginary cells as shown in FIG. 7. Laser scribe lines S were made in regions A1, B2 and C3 and form a diagonal across the back side of the slider. The scribes in cells A1 and C3 were about 450 μm long and the scribes in cell B2 were about 250 μm long. The curvature results are shown in FIG. 8. The number of scribe lines was varied, for example, as seen for sliders 1 to 5, there is a designation (5,0,5) at the top of FIG. 8. This means that cells A1 and C3 had 5 scribe lines, and cell B2 had 0 scribe lines. As seen in FIG. 8, the number of scribe lines varied from 5–9 for cells A1 and C3, and from 0–11 for cell B2. The average twist change for the middle three sliders within each group of 5 sliders was found to be as follows. For sliders 2 to 4, where the number of scribes in cells Al, B2, C3 was (5,0,5), the average twist change was −17.0 nm. For sliders 7 to 9, with (5,6,5) scribes, the average twist change was −18.7 nm. For sliders 12 to 14, with (5,11,5) scribes, the average twist change was −18.9 nm. For sliders 17 to 19, with (7,0,7) scribes, the average twist change was −22.4 nm. For sliders 22 to 24, with (7,4,7) scribes, the average twist change was −21.3 nm. For sliders 27 to 29, with (7,7,7) scribes, the average twist change was −22.1 nm. For sliders 32 to 34, with (9,0,9) scribes, the average twist change was −26.5 nm. For sliders 37 to 39, with (9,3,9) scribes, the average twist change was −23.0 nm.

Figure 9A:
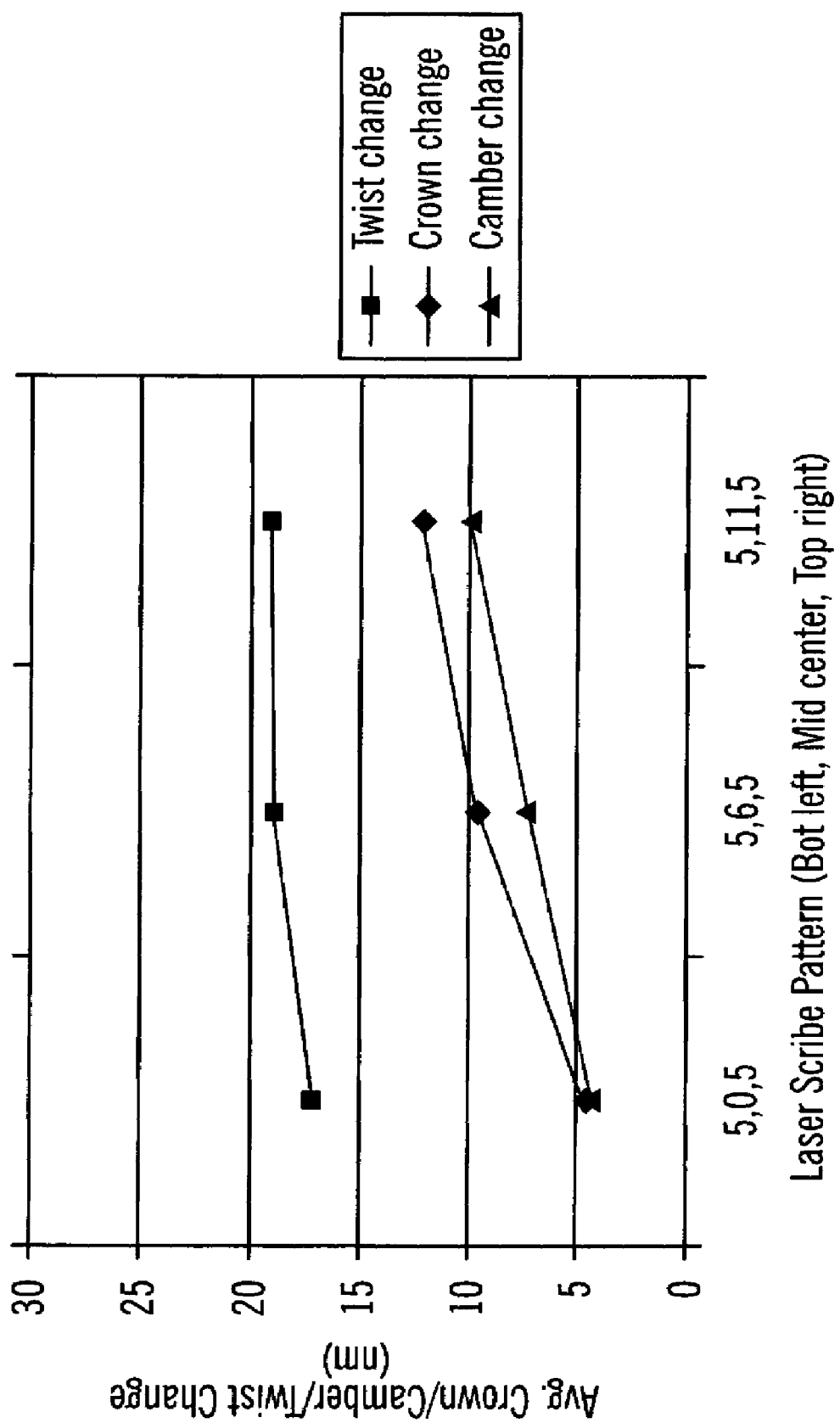
FIGS. 9a–9c illustrate comparisons of the average curvature (twist, crown and camber) changes for some of the laser scribe patterns of FIG. 7 in accordance with embodiments of the present invention.
Figure 9B:
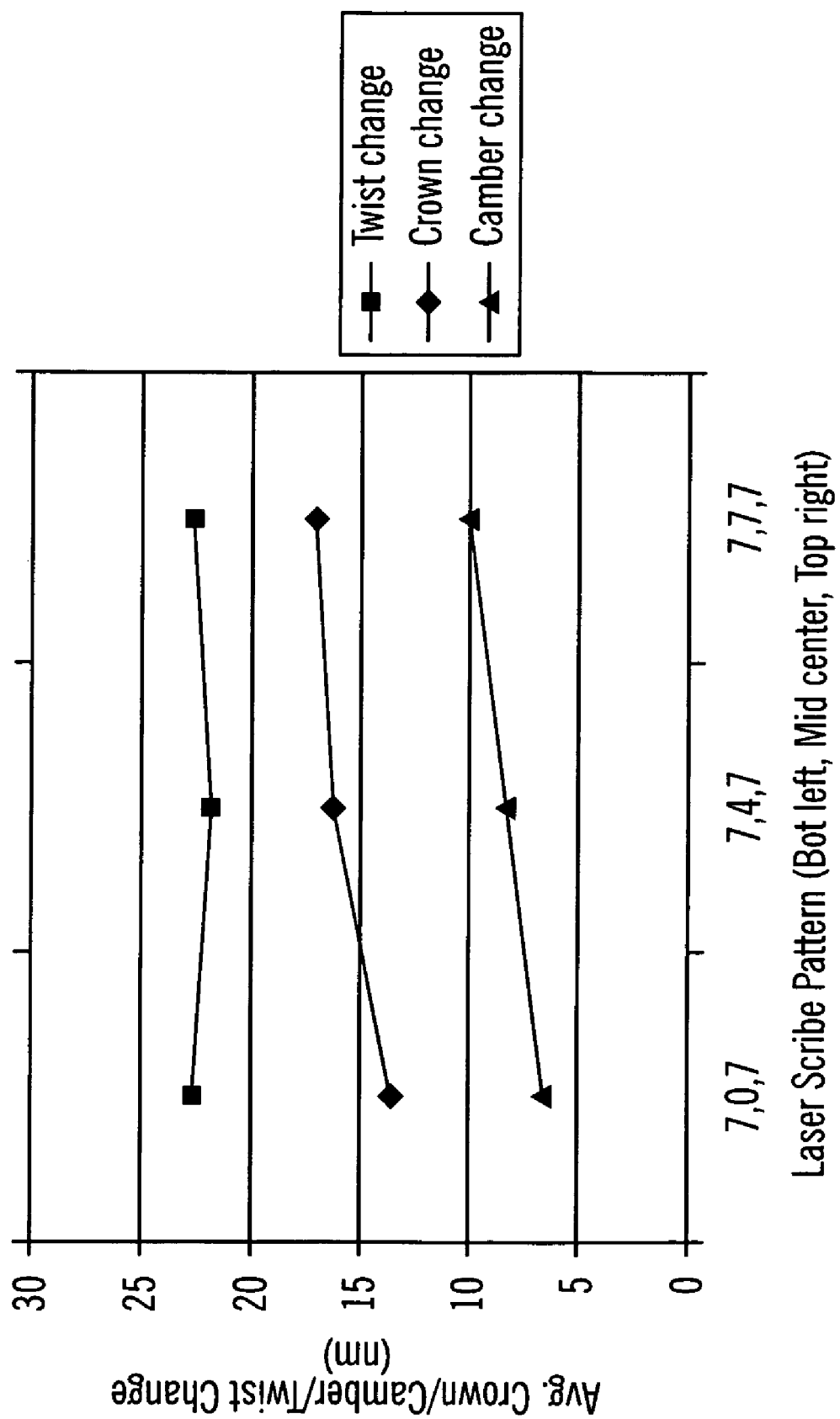
Figure 9C:
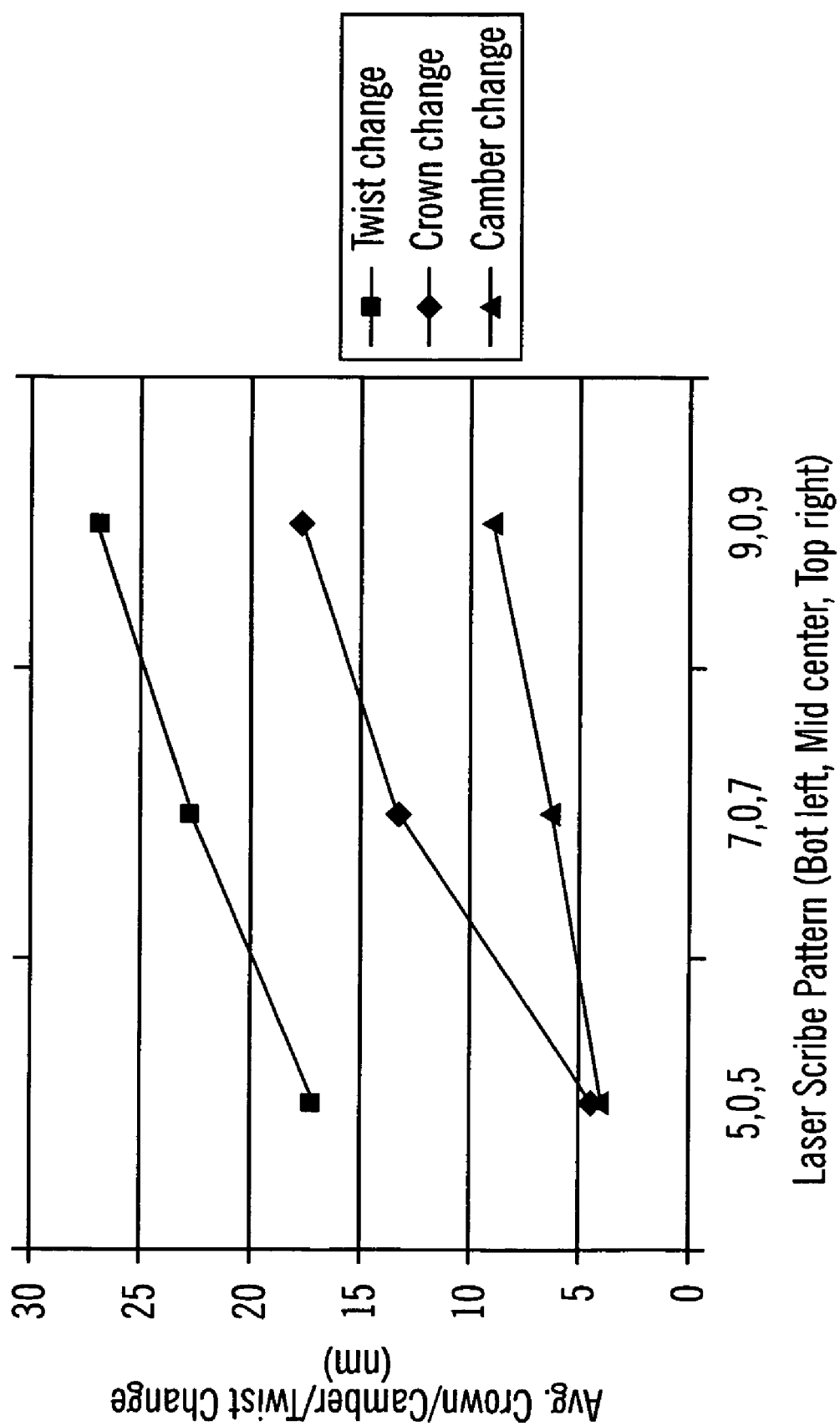

Some of the data from FIG. 8 is set forth in graphical form illustrating the slider curvature change by laser scribe pattern in FIGS. 9a, 9b and 9c.

FIG. 9a illustrates a comparison of the magnitude of the average changes in twist, crown and camber for laser scribe patterns in which the top left, middle center and bottom right cells (A1, B2 and C3 as shown in FIG. 7) of the back surface are scribed as follows. The area on the x-axis labeled (5,0,5) means that there were 5 scribes made in cells A1 and C3, and 0 scribes made in cell B2. The area labeled (5,6,5), indicates that there were 5 scribes made in cells A1 and C3, and 6 scribes made in cell B2. The area labeled (5,11,5) indicates that there were 5 scribes made in cells A1 and C3, and 11 scribes made in cell B2. The data indicates that the twist change ranged from about 17 nm for (5,0,5) to about 19 nm for both (5,6,5) and (5,11,5). The crown change ranged from about 5 nm for (5,0,5) to about 10 nm for (5,6,5) to about 12 nm for (5,11,5). The camber change ranged from about 5 nm for (5,0,5) to about 7 nm for (5,6,5) to about 10 nm for (5,11,5).

FIG. 9b similarly illustrates a comparison of the magnitude of the average changes in twist, crown and camber for laser scribe patterns in which cells A1, B2 and C3 were scribed as follows. The data indicates that the twist change ranged from about 22 nm for (7,0,7) to about 21 nm for (7,4,7) to about 22 nm for (7,7,7). The crown change ranged from about 13 nm for (7,0,7) to about 16 nm for (7,4,7) to about 17 nm for (7,7,7). The camber change ranged from about 6 nm for (7,0,7) to about 8 nm for (7,4,7) to about 10 nm for (7,7,7).

FIG. 9c also illustrates a comparison of the magnitude of the average changes in twist, crown and camber for laser scribe patterns in which cells A1, B2 and C3 were scribed as follows. The data indicates that the twist change ranged from about 17 nm for (5,0,5) to about 22 nm for (7,0,7) to about 27 nm for (9,0,9). The crown change ranged from about 5 nm for (5,0,5) to about 13 nm for (7,0,7) to about 18 nm for (9,0,9). The camber change ranged from about 5 nm for (5,0,5) to about 6 nm for (7,0,7) to about 9 nm for (9,0,9).

From the examples described above, a number of observations can be made. Twist change can be either positive or negative. A pattern such as that in FIG. 5a produces a positive twist change. The opposite (handed) pattern such as that in FIGS. 5b and 7 produces a negative twist change.

In addition, scribing the opposite corner cells appears to have a greater influence on twist than on camber and crown, while scribing the center cell appears to have a greater influence on camber and crown than on twist. In addition, lines scribed closest to the edges of the back surface appear to have a greater influence on twist than other lines scribed closer to the center.

In addition, sliders can be twist adjusted without significantly affecting camber and crown by laser scribing at opposite corners on the flex side and by maintaining the scribes to be short. The experimental data indicates that 250 μm long scribes do not significantly affect camber and crown while 450 μm long scribes and 500 μm long scribes increase camber and crown.

It also appears that since the first scribes made in the embodiments above were closest to the leading and trailing (deposited end) edges of the slider, when more scribes are made, they progress toward the mid-span of the slider, and as a result crown increases more than camber and twist changes as the number of scribe lines increases.

In addition, sequential scribes with the first scribes made closest to the leading and trailing (deposited end) edges of the slider show, for example, in FIG. 9c, nonlinear increases in twist. In certain embodiments it is preferred that the progression in twist with the number of scribe pairs is a closer approximation of linearity.

In addition, crown and camber appear to be insensitive to twist adjust when the scribes are short, e.g. about 250 µm, even when many scribes (up to 10 were tested above) are made as shown in FIG. 6b.

In addition, while scribe lines may be formed about 20–100 µm apart, certain preferred embodiments have a much smaller spacing of up to about 20 µm, even more preferably up to about 10 µm apart.

Figure 10:
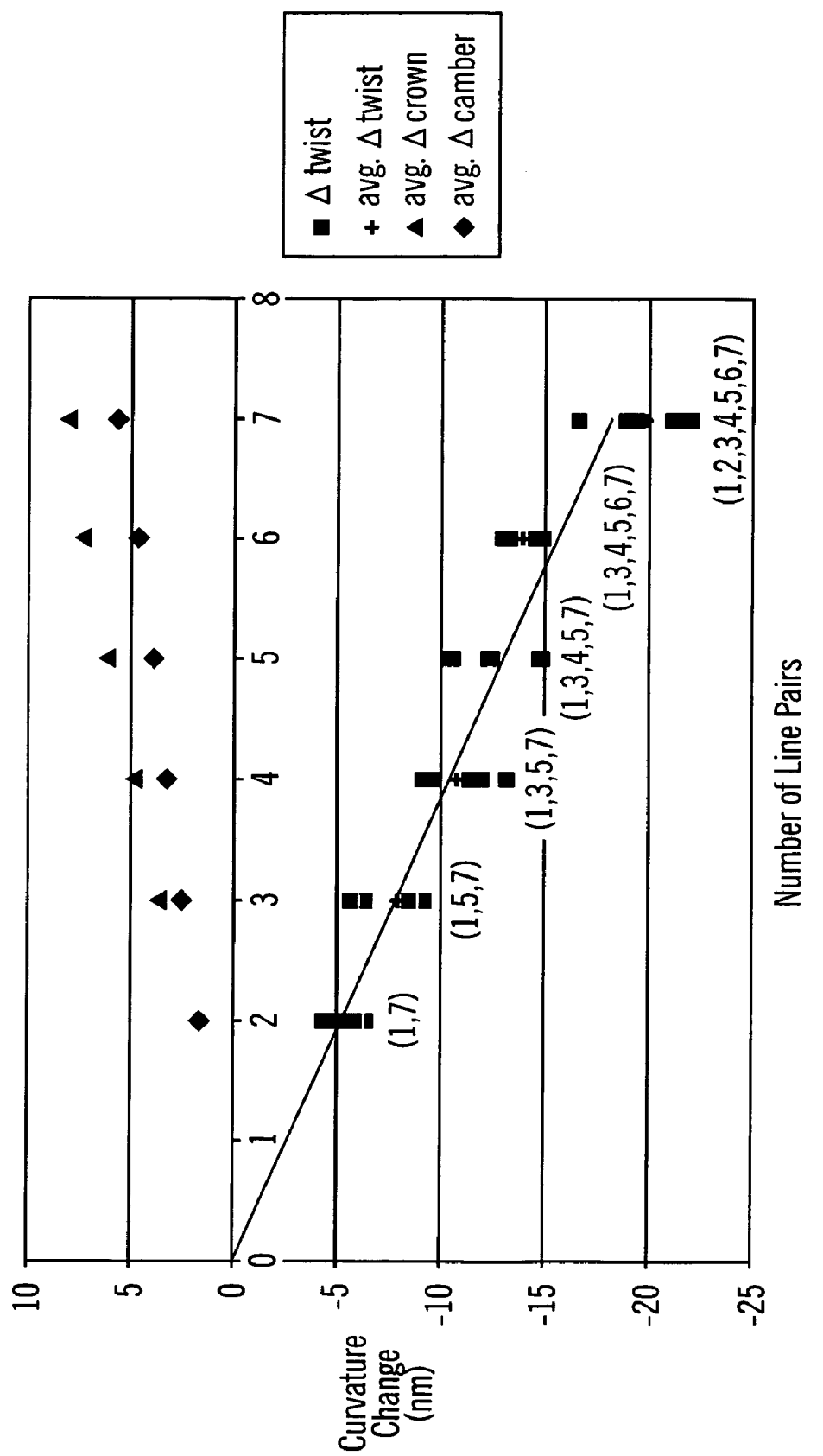
FIG. 10 illustrates the average curvature (twist, crown and chamber) changes per incremental scribe number where scribes were made in a top left cell and bottom right cell in accordance with an embodiment of the present invention.

FIG. 10 illustrates the average twist, crown and chamber changes-per incremental scribe number where scribes were made in the top left cell (A1) and the bottom right cell (C3). The data in FIG. 10 also illustrates a method to approximate linear twist increment with the number of scribe line pairs in regions A1 and C3. The scribes were 47 µm apart and 400 µm in length. A maximum of 7 scribes were made in each region. As shown in FIG. 7, the scribe closest to the leading (102) and trailing (104) edges is scribe 1, the next scribe 47 µm apart is scribe 2, etc. The last scribe in the region was scribe 7, which is the farthest scribe from the leading and trailing edges. To approximate linear twist increment, for 2 scribe line pairs, the scribe numbers were (1,7). For 3 scribe line pairs, the scribe numbers were (1,5,7). For 4 scribe line pairs, the scribe numbers were (1,3,5,7). For 5 scribe line pairs, the scribe numbers were (1,3,4,5,7), For 6 scribe line pairs, the scribe numbers were (1,3,4,5,6,7). For 7 scribe line pairs, the scribe numbers were (1,2,3,4,5,6,7). For twist the figure shows individual data points and average values, and a line shows the linearity of the change in twist as the number of scribed line pairs increases. The sensitivity was about 2.4 nm/line pair. Average values of the changes in crown and camber are also shown. Relatively linear changes to twist, crown and camber are seen as the number of scribe line pairs in increased. Thus, the amount of change can be controlled by determining the appropriate order of the scribe location and number of scribes necessary to achieve the desired result.

Figure 1:
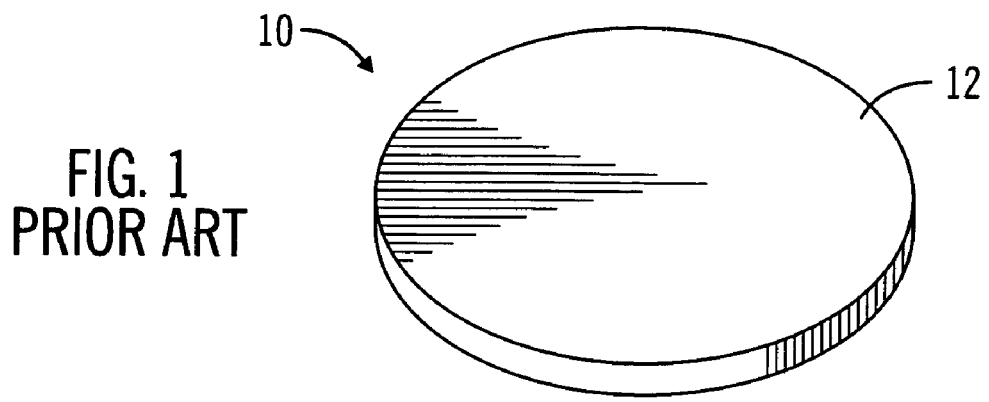
FIG. 1 is a perspective view of a wafer from which a plurality of sliders may be manufactured.
Figure 2:
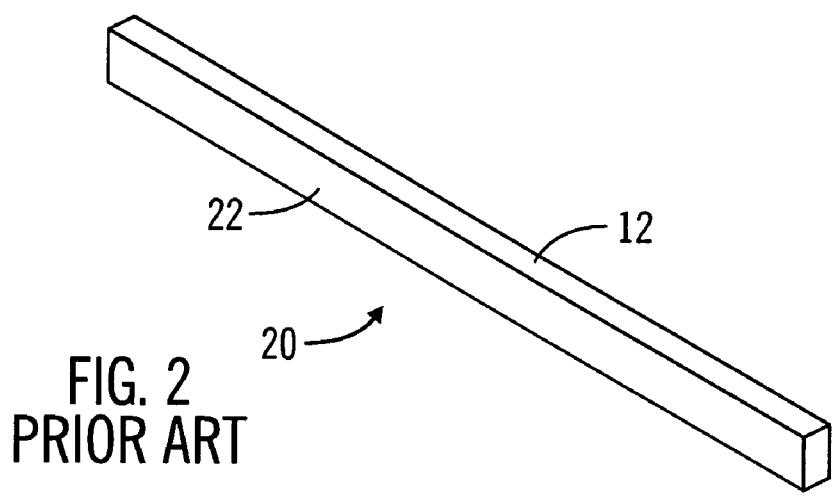
FIG. 2 is a perspective view of a row cut from the wafer of FIG. 1 during slider manufacturing.
Figure 3:
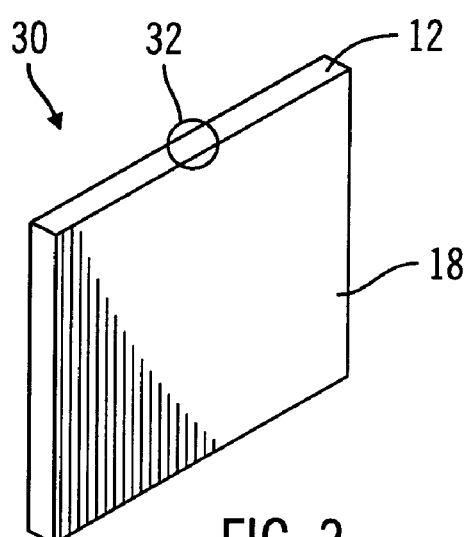
FIG. 3 is a perspective view of an individual slider component diced from the row of FIG. 2.
Figure 4A:
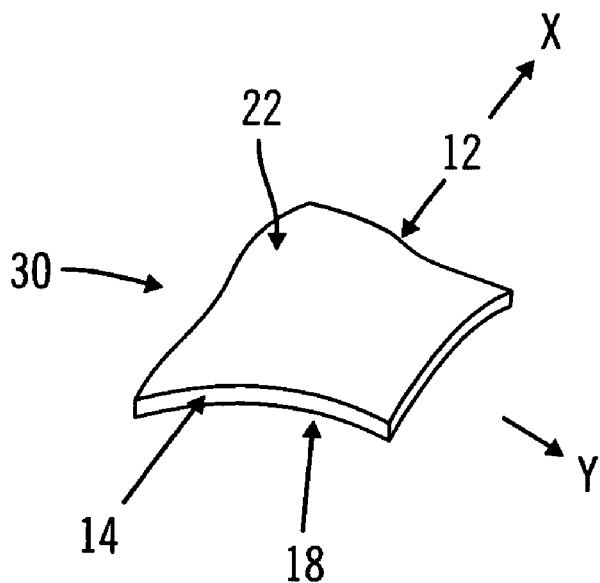
FIGS. 4a and 4b illustrate slider curve parameters and the relationship between a slider and an disk surface.
Figure 4B:
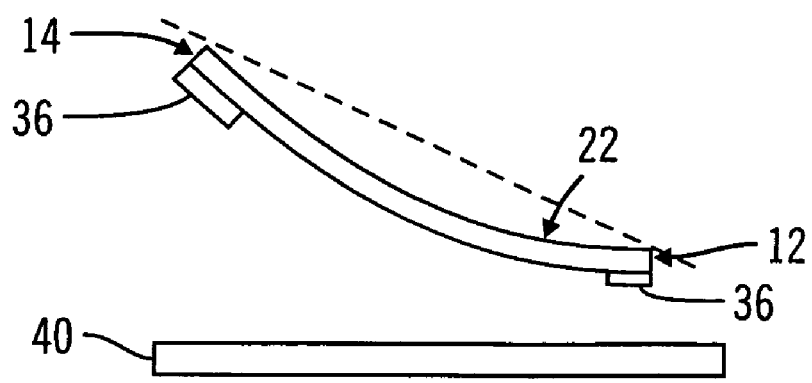
Figure 11:
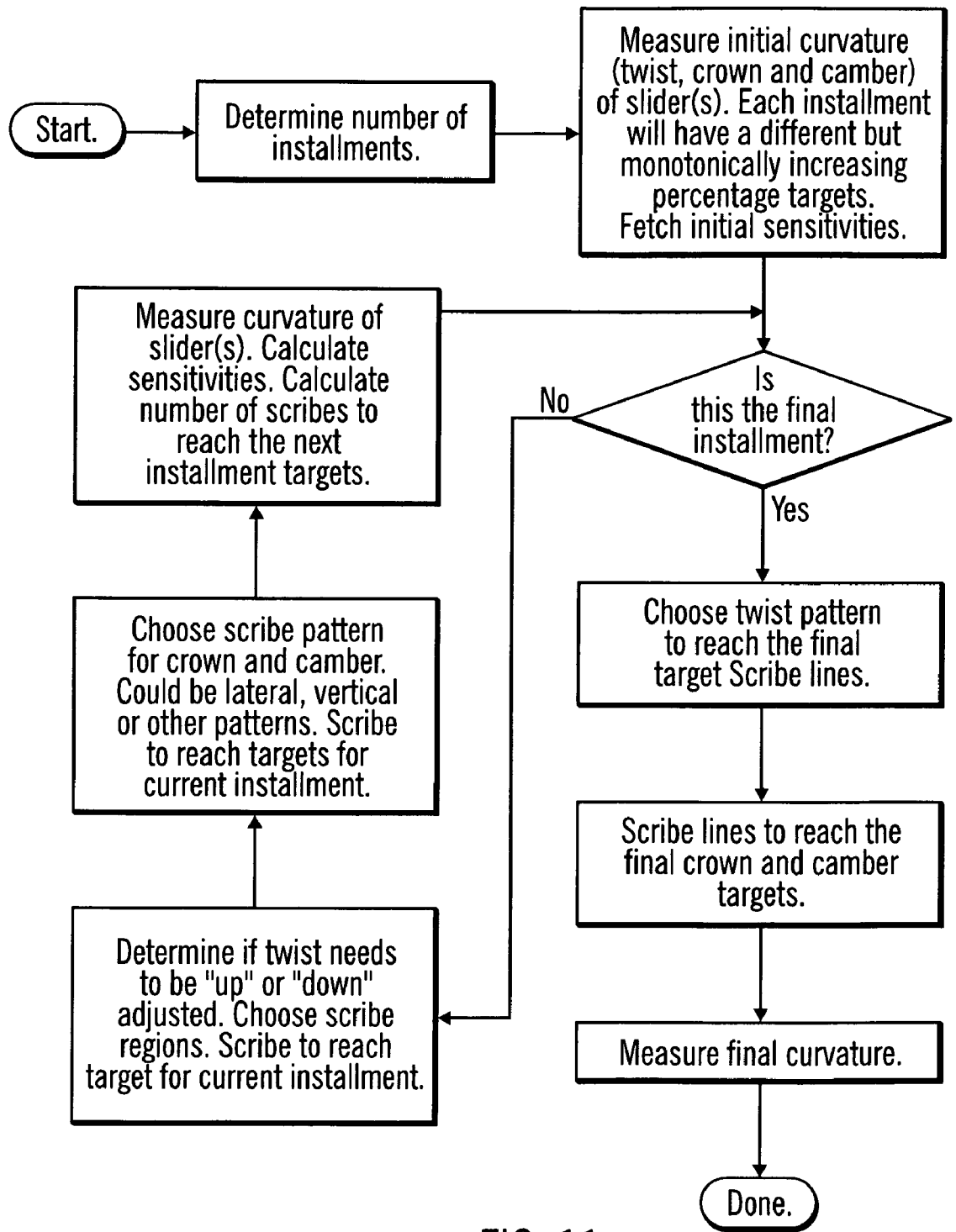
FIG. 11 sets forth a flow chart for an arbitrary number of installments to provide simultaneous twist, crown and camber adjust in accordance with an embodiment of the present invention.

Embodiments may also include a methodology to provide simultaneous twist, crown and camber adjust. A flow chart for an arbitrary number of installments is shown in FIG. 11. Note that for FIG. 11, the target is indicated as the percentage target. The percentage target is by definition the percentage of the difference between the target curvature (twist, crown and camber) and the initial curvature. Thus, an 80% target means a target which is 80% of the curvature difference (target curvature minimum—initial curvature). There is a percentage target for each installment and curvature type. Percentage targets are generally monotonically increasing such that they are all equal to 100% for the final installment. A version of a 2-installment process for the case of either isolated sliders or sliders in a row is described. It should also be noted that for symmetrical scribes (e.g., a lateral scribe spanning cells such as A2, B2 and C2 or a vertical scribe spanning cells such as A1, A2 and A3 in FIG. 4), twist does not appear to be appreciably affected. However, the asymmetric scribes as discussed above do produce appreciable twist changes.

FIG. 7, as described above, divides the back side into an imaginary 3×3 arrangement of cells. The actual implementation of certain preferred embodiments is not necessarily limited to such an arrangement.

The steps of a two-installment process according to one embodiment may be described as follows.

(1) Measure the curvature (twist, crown and camber) of the slider, preferably in situ.

(2) Select a short scribe length such as, for example, 250–300 µm and scribe either cells A1 and C3 or C1 and A3 depending on whether a negative or positive twist change is desired. The number of scribe lines may be determined by the initial sensitivity (twist change per scribe pair), the order of scribing the lines, and how close to reaching the target with each scribe is desired. In FIG. 8, sliders 1 to 5, for example, the sensitivity would be −17/5=−3.4 nm per scribe line pair. As an example, the percentage target for the first and second (final) installments are 80% and 100%, respectively. The initial sensitivity can be a default value based on previous adjusts, an assumed value, a product type value, etc.

(3) Scribe either horizontal lines in cells A2, B2 and C2 or vertical lines in cells B1, B2 and B3 to provide crown and camber increase. The actual selection of scribe direction depends on the slider type, amount of change required, and initial sensitivities of the scribe on curvature. Generally, horizontal scribes affect crown more than camber, and vice versa for vertical scribes. The number of scribes in this item (3) again depends on how close is desired to be near the target values. For simplicity, the same percentage targets as for twist (80%, 100%) for both crown and camber may be used. The initial sensitivities for crown and camber, as for twist, may be supplied by the user.

(4) The slider curvature is measured a second time. This is the end of the first installment. The amount required to reach each of the twist, crown and camber targets is then determined. The new sensitivities for individual sliders in the row may then be determined based on the first installment and the number of scribes required to reach targets is determined.

(5) If the twist is not at the target value, more lines are scribed, as determined in (4), in the same cells which are diagonally opposite as before. If the twist change exceeds the target, then it can be adjusted down by scribing in the other pair of opposite corners.

(6) More horizontal or vertical scribes may be made, as determined in (4), so that camber and crown can reach their targets.

(7) A third and final curvature measurement is made. This is the end of the second and final installment. The target curvature values have been reached.

The above steps describe an embodiment of a 2-installment process including up to 2 adjusts each for twist, crown and camber. Preferably three curvature measurements are made. A greater or smaller number of installments may be used in various embodiments, as desired. In addition, it may be desirable in certain embodiments to use a method similar to the above steps but adjust only one or two of the twist, crown and camber.

Measuring curvature and forming the laser scribes may be made using a variety of methods as known in the art. U.S. Pat. Nos. 6,075,604 and 6,108,170 describe certain processes for measuring curvature and forming scribes and each is hereby incorporated by reference in its entirety. Scribes may be made using a variety of systems, including, but not limited to pulsed laser, continuous laser, diamond or other hard material tool, or other system that modifies the surface stress of the slider. In addition, the scribes may take a variety of forms including, but not limited to a continuous line, a dotted line, a series of line segments, or curved path along the slider surface.

Certain embodiments may be applicable to individual sliders and/or sliders attached together in rows.

It will, of course, be understood that modifications of the present invention, in its various aspects, will be apparent to those skilled in the art. Other embodiments are possible, their specific features depending upon the particular application.

What is claimed:

1. A method for altering the curvature of a slider including an air bearing surface, a leading edge, a trailing edge opposite the leading edge, and a back surface opposite the air bearing surface, the back surface including an upper right corner region, an upper middle region, and an upper left corner region adjacent to the trailing edge, the back surface also including a lower right corner region, a lower middle region, and a lower left corner region adjacent to the leading edge, the back surface also including a center right region, a center middle region, and a center left region, the method comprising:

forming a first scribe in one of the upper right corner region or the upper left corner region;

forming a second scribe in one of the lower left corner region or the lower right corner region, wherein the first and second scribes are located in one of (i) the upper right corner region and lower left corner region, or (ii) the upper left corner region and lower right corner region; and forming a third scribe in at least one of the center right region, the center middle region, or the center left region;

wherein the first and second scribes are formed to be the same length, and the third scribe is formed to be a different length than that of the first and second scribes.

2. A method as in claim 1, wherein the scribes are formed using at least one of a pulsed laser, a continuous laser, a diamond scribe.

3. A method as in claim 1, wherein the scribes are made using a method that modifies the surface stress of the slider.

4. A method as in claim 1, wherein the scribe lines are made using a pulsed laser.

5. A method as in claim 1, further comprising forming the first and second scribes to each be about 250–300 µm in length.

6. A method as in claim 1, further comprising forming the first and second scribes to each be about 450 µm in length.

7. A method for adjusting the twist, crown and camber of an air bearing surface of at least one slider to substantially match target values for twist, crown and camber, the at least one slider having a back surface opposite the air bearing surface, the back surface including the back surface including an upper right corner region, an upper middle region, and an upper left corner region adjacent to the trailing edge, the back surface also including a lower right corner region, a lower middle region, and a lower left corner region adjacent to the leading edge, the back surface also including a center right region, a center middle region, and a center left region, the method comprising:

measuring the twist, crown and camber of the at least one slider;

forming a first group of twist scribes on the back surface, the first group of twist scribes each having a first length, the first group of twist scribes including at least one scribe in one of the upper right corner region or the upper left corner region, the first group of twist scribes also including at least one scribe in one of the lower left corner region or the lower right corner region, the first group of twist scribes being formed in diagonally opposite corner regions;

forming a first group of crown and camber scribes on the back surface, the first group of crown and camber scribes each have a second length, wherein the second length is different than the first length, and wherein the first group of crown and camber scribes includes at least one scribe in at least one of the center right region, the center middle region, the center left region, the upper middle region, and the lower middle region;

measuring the twist, crown and camber of the slider and comparing the values to the target values for twist, crown and camber;

forming additional twist scribes if the target value for twist is not obtained; and forming additional crown and camber scribes if the target values for crown and camber are not obtained.

8. A method as in claim 7, wherein the scribes are formed using at least one of a pulsed laser, a continuous laser, a diamond scribe.

9. A method as in claim 7, wherein the scribes are made using a method that modifies the surface stress of the slider.

10. A method as in claim 7, wherein the scribe lines are made using a pulsed laser.

11. A method as in claim 7, wherein the twist scribes are located on a different portion of the back surface than the crown and camber scribes.

12. A method as in claim 11, wherein the slider defines a leading edge, and the laser twist scribes are formed in a direction substantially parallel to the leading edge.

13. A method as in claim 11, wherein the crown and camber scribes are formed in a direction substantially parallel to the leading edge.

14. A method as in claim 11, wherein the crown and camber scribes are formed in a direction substantially perpendicular to the leading edge.

15. A method as in claim 11, wherein the laser crown and camber scribes are formed in a center region of the back surface.

16. A method as in claim 7, the forming additional twist scribes includes forming scribes in the same corner regions as the first group of twist scribes.

17. A method as in claim 7, the forming additional twist scribes includes forming scribes in different corner regions than the first group of twist scribes.

18. A method as in claim 7, further comprising forming the first length to be about 250–300 µm.

19. A method for adjusting the twist, crown and camber of an air bearing surface of at least one slider to substantially match target values for twist, crown and camber, the at least one slider having a back surface opposite the air bearing surface, the back surface including the back surface including an upper right corner region, an upper middle region, and an upper left corner region adjacent to the trailing edge, the back surface also including a lower right corner region, a lower middle region, and a lower left corner region adjacent to the leading edge, the back surface also including a center right region, a center middle region, and a center left region, the method comprising:

measuring the twist, crown and camber of the at least one slider;

forming a first group of scribes on the back surface, the first group of scribes each having a length in the range of 450–500 μm, the first group of scribes including at least one scribe in one of (i) the upper right corner region and lower left corner region, or (ii) the upper left corner region and lower right corner region;

forming a second group of scribes on the back surface, wherein the second group of scribes includes at least one scribe in at least one of the center right region, the center middle region, the center left region, the upper middle region, and the lower middle region;

after forming the second group of scribes, measuring the twist, crown and camber values of the slider and comparing the values to target values for twist, crown and camber; and forming a third group of scribes each having a length in the range of 250–300 μm, the third group of scribes including at least one scribe in one of (i) the upper right corner region and lower left corner region, or (ii) the upper left corner region and lower right corner region;

wherein a determination of a number and location of the scribes in the third group is based at least in part on the comparing the values to target values for twist.

20. The method of claim 19, further comprising forming a fourth group of scribes on the back surface, wherein the fourth group of scribes includes at least one scribe in at least one of the center right region, the center middle region, the center left region, the upper middle region, and the lower middle region; and wherein a determination of a number and location of the scribes in the fourth group is based at least in part on the comparing the values to target values for crown and camber.

* * * * *